US007586729B2

(12) United States Patent
Göhler et al.

(10) Patent No.: US 7,586,729 B2

(45) Date of Patent: Sep. 8, 2009

(54) SURGE ARRESTER HAVING A DISCHARGE ELEMENT

(75) Inventors: Reinhard Göhler, Berlin (DE); Daniel Pepper, Berlin (DE); Erhard Pippert, Seeburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/911,002

(22) PCT Filed: Apr. 5, 2006

(86) PCT No.: PCT/EP2006/061342

§ 371 (c)(1),
(2), (4) Date: Oct. 15, 2007

(87) PCT Pub. No.: WO2006/106117

PCT Pub. Date: Oct. 12, 2006

(65) Prior Publication Data

US 2008/0151460 A1 Jun. 26, 2008

(30) Foreign Application Priority Data

Apr. 8, 2005 (DE) ....................... 10 2005 017 083

(51) Int. Cl.
*H02H 1/00* (2006.01)

(52) U.S. Cl. ...................................................... 361/127

(58) Field of Classification Search .................. 361/127
See application file for complete search history.

(56) References Cited

U.S. PATENT DOCUMENTS

| | | | | |
|---|---|---|---|---|
| 5,218,508 | A * | 6/1993 | Doone | 361/127 |
| 5,570,264 | A | 10/1996 | Lundquist et al. | |
| 6,008,977 | A | 12/1999 | Thatcher | |
| 6,678,139 | B1 | 1/2004 | Greuter et al. | |
| 6,735,068 | B1 | 5/2004 | Hartman et al. | |

FOREIGN PATENT DOCUMENTS

| | | | |
|---|---|---|---|
| DE | 43 19 986 | A1 | 12/1994 |
| DE | 199 26 950 | A1 | 12/2000 |
| WO | 94/29888 | | 12/1994 |
| WO | 98/38653 | | 9/1998 |

* cited by examiner

*Primary Examiner*—Ronald W Leja
(74) *Attorney, Agent, or Firm*—Laurence A. Greenberg; Werner H. Stemer; Ralph E. Locher

(57) ABSTRACT

A surge arrester has a diverter element with a shielding element that increases the creepage path. The shielding element includes at least one shield. The shielding element is configured from an electrically insulating material and the diverter element forms a discharge current path. One section of the diverter element lying adjacent to the shield is not covered by the electrically insulating material. The diverter element is provided with a support element, which mechanically stabilizes a shield.

9 Claims, 2 Drawing Sheets

SURGE ARRESTER HAVING A DISCHARGE ELEMENT

BACKGROUND Of THE INVENTION

Field of the Invention

The invention relates to a surge arrester having a discharge element which is used to form a discharge current path, and is surrounded by a shield, which lengthens the creepage distance, with at least one shield composed of an electrically insulating material.

One such surge arrester is known, for example, from WO 98/38653. This document describes a surge arrester which has a discharge element through which a bracing element passes. The discharge element is provided with a connecting element at each of its ends. The discharge element is surrounded by an electrically insulating material, with a large number of shields being provided. The shielding lengthens the creepage distance between the connecting elements, thus increasing the withstand voltage.

During a discharge process, a comparatively high current is passed through the discharge element. This results in a large amount of heat being developed within a short time in the interior of the discharge element, and this must be emitted to the surrounding area.

If the discharge element is excessively heated, this can lead to irreparable damage to the surge arrester.

BRIEF SUMMARY OF THE INVENTION

The invention is based on the object of designing a surge arrester of the type mentioned initially, such that excessive heating of the discharge element is avoided.

According to the invention, the object is achieved in that at least one section of the discharge element which is not covered by the electrically insulating material is arranged adjacent to the shield.

Sections of the discharge element which are not covered by the electrically insulating material can emit thermal energy better. In this case, it is advantageous for the discharge element to make direct or indirect contact with a gas which allows convection. By way of example, metal-oxide varistors are used as discharge elements. These are normally manufactured using a sintering process and, if required, are provided with glazing which increases their mechanical strength. Sintered materials such as these are able to quickly dissipate outwards the heat created in the interior as a result of a current flow, and to radiate it away there. This heat can be quickly radiated away and dissipated from the surfaces of the discharge element by means of a gas which allows convection. In this case, it is possible to provide for the surface to additionally be provided with a suitable structure in order to additionally have a positive influence on the heat that is emitted. For example, the glazing can be designed appropriately, or an additional coating can surround the discharge element. If the discharge element has an essentially cylindrical shape, it is preferable for the sections that are not covered to be arranged radially with respect to the cylinder axis.

A further advantageous refinement provides for the at least one section to extend in an annular shape around the discharge element.

Normally, a shield for lengthening the creepage distance has a circumferential structure in the form of a plate. For dielectric reasons, discharge elements are preferably essentially cylindrical. The shield is then arranged radially with respect to the cylinder axis of the discharge element. If a plurality of shields are arranged along the cylinder axis, it is advantageous for the free sections of the discharge element to be annular. These can then be arranged, for example, between two shields. In this case, it is advantageous for the ring to be in the form of a cylindrical casing. This allows the heat to be radiated away on all sides.

It is advantageously possible to provide, for example, for the shield to be held at least partially by a supporting element which is in contact with the discharge element.

Since the discharge element is covered by a cover composed of electrically insulating material only in places, it is advantageous to associate supporting elements with the shields, so that they are sufficiently mechanically strong. The supporting elements also make it possible to reduce the wall thickness of the shields so that only the amounts of insulating material which are necessary to carry out their electrical task, specially to lengthen the creepage distance, are used, since the mechanical strength can be provided by the supporting element. For example, it is possible to provide for the electrically insulating material to rest on the discharge element, and for the capability for holding forces to also be transmitted via the contact surface. However, the supporting element can also be designed such that the electrically insulating material is kept at a distance from the discharge element.

It is advantageously possible to provide for the discharge element to be formed from a plurality of mutually abutting blocks, and for at least one abutment point to be covered by a shield.

Covering an abutment point with a shield protects it against the ingress of foreign bodies or moisture. The discharge element is sealed on the outside at the abutment points. Furthermore, good heat transfer outwards is made possible by means of the areas which remain free on the outer surfaces of the discharge element. In this case, it is possible to provide for the shields to be cast onto the discharge element and/or the supporting elements. However, it is also possible to provide for the shields to be prefabricated, and to be fitted to the discharge element and/or to the supporting elements.

It is advantageously possible to provide for the supporting element to be inserted into the abutment point.

The insertion of the supporting element into the abutment point allows the discharge element itself to be designed in a simple form. There is no need for any additional holding apparatuses.

One advantageous refinement makes it possible to provide for the supporting element to extend in the form of a disk between two mutually abutting blocks.

In one refinement of the supporting element in the form of a disk, the supporting element projects into the discharge current path to be formed. For this purpose, it is advantageous for the supporting element to be manufactured from an electrically conductive material, for example a metal or a plastic. The insertion of disks of different thickness between the individual blocks of the discharge element makes it possible, for example, to also compensate for manufacturing tolerances relating to the dimensions of the blocks, so that the discharge element has a standard length. In this case, the supporting element can essentially map the cross-sectional area of the discharge element, that is to say the supporting element can therefore be designed to be essentially in the form of a circular disk. In order to introduce the appropriate supporting force into the shielding, it is advantageous for the disk to be enlarged beyond the cross section of the discharge element, thus resulting in a circumferential ring. Alternatively, however, it is also possible to provide for only individual webs to project like rays from the discharge element, and for the supporting element to extend like a disk only in the area of the contact surfaces of the blocks.

It is also advantageously possible to provide for the supporting element to have a field control element in order to control an electrical field.

The sections of the supporting element which are arranged in the interior of the discharge element may themselves be part of a discharge current path to be formed, and are therefore arranged in a dielectrically protected form. In order to avoid any disadvantageous influence on the dielectric effect of the discharge element itself, one or more field control electrodes can be arranged on the supporting element, homogenizing the electrical field. In this case, by way of example, it is possible to provide for the field control element and/or the supporting element to be surrounded by the electrically insulating material of the shield. By way of example, field control electrodes in the form of annular rings can be used as field control electrodes. By way of example, these can be produced by appropriate shaping of the supporting element. For this purpose, in the case of a circular disk, the edge of the circular disk can be provided with appropriate profiling. However, it is also possible to attach a separate field control electrode to the supporting element. The field control electrode should have a surface shape which has a positive influence on the electrical field.

Furthermore, it is advantageously possible to provide for the electrically insulating material to be a silicone.

In order to also use the surge arresters in the medium-voltage, high-voltage and very-high-voltage range, that is to say at voltages from 10 kV up to 550 kV or more, appropriately high-quality insulating materials must be used in order to prevent partial discharges occurring in the insulating material. Silicones can be processed and formed into different shapes easily. In the case of silicones, it is therefore particularly advantageous for them to be sprayed directly onto the discharge element, so that any supporting elements which may be present are encapsulated, thus resulting in a mechanically strong connection between the discharge element and the shield that is formed. Exemplary embodiments of the invention will be described in more detail in the following text and are illustrated schematically in the figures, in which:

DESCRIPTION OF THE INVENTION

Figure 1:
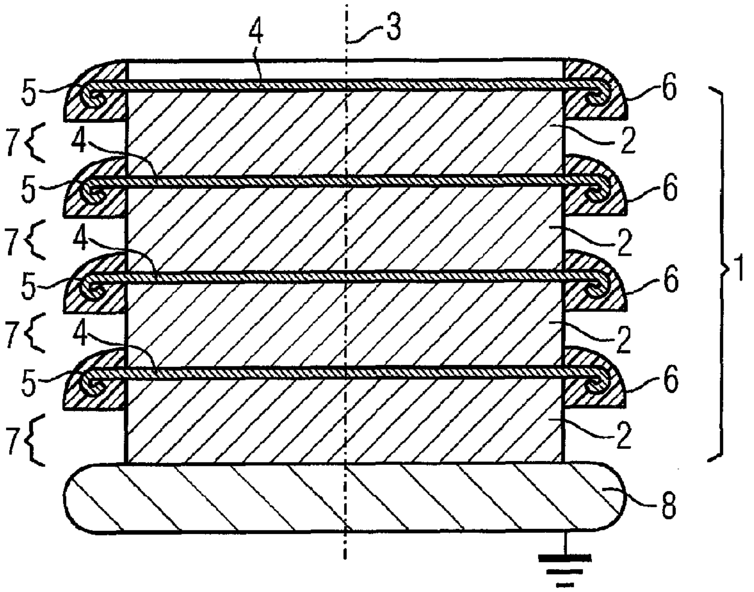
FIG. 1 shows a section through a surge arrester having a discharge element.

The surge arrest illustrated in the form of a section in FIG. 1 has a discharge element 1 which is formed from a multiplicity of individual blocks 2. The blocks are each cylindrical, with their cylinder axis 3 lying on the plane of the drawing. Furthermore, however, other embodiments of the blocks 2 can also be used. For example, the blocks may also be in the form of hollow cylinders, thus resulting in a recess along the cylinder axis 3, through which, for example, bracing elements can be passed.

The individual blocks 2 are each arranged coaxially with respect to one another, with two adjacent blocks in each case abutting against one another. A supporting element 4 in the form of a disk is in each case inserted in the area of the abutment point. The supporting element 4 which is in the form of a disk is formed from an electrically conductive material, for example a metal. The supporting element 4 makes contact with each of the blocks 2 which are arranged adjacent to one another. The blocks 2 themselves are formed from a sintered metal oxide. In this case, it is possible to provide for the outer surface to be provided with a coating or sheathing which improves the mechanical strength of the surface. By way of example, glazing, plastic sheathing or the like can be applied.

The supporting elements 4 are in the form of circular disks, with the circle diameter being greater than the diameter of the discharge element 1. This results in a circumferential ring radially on the circumference of each supporting element 4. This circumferential ring is in the form of a bead at its radially outer edge, so that the supporting element 4 has a field control electrode 5 in order to control the field. The field control electrodes 5 may, however, alternatively also be formed by separate circular rings attached to the supporting elements 4. Together with the field control electrodes 5, the supporting elements 4 are each surrounded by a shield 6, and are thus protected against corrosion. By way of example, the shields 6 are cast onto the discharge element 1 and are composed of an electrically insulating material, for example a silicone. The shields 6 in this case each cover one abutment point between two blocks 2 which are arranged adjacent to one another. This protects the discharge element 1 against the ingress of moisture and foreign bodies. An annular section 7 is formed between each of the individual shields, and is arranged coaxially with respect to the cylinder axis 3. The annular sections 7 are each in the form of cylindrical casings. Heat can be emitted via the annular sections 7 from the interior of the discharge element 1 to a surrounding gas area in a simpler form. In order to additionally influence this heat emission, the surface of the blocks 2 can be provided with a suitable structure in the area of the annular sections. For example, the glazing may have an appropriate structure to enlarge the surface area. Alternatively, it is also possible to use other sheaths in order to have a positive influence on the heat emission.

The supporting elements 4 also have a positive influence on the heat emission. The choice of metallic supporting elements 4 allows heat to be dissipated quickly from the interior of the discharge element 1 via the supporting elements 4 located between the abutments. Heat can additionally be transported outwards via those sections of the supporting elements 4 which are located in the shield 6. In order to have a positive influence on the heat transfer from the blocks 2 to the supporting elements 4, it is possible to provide for the discharge element 1 to be compressed by bracing elements which are not illustrated in any more detail in FIG. 1. By way of example, these bracing elements may be GFRP rods which press the blocks 2 against a baseplate 8. In this case, for example, the baseplate 8 can be manufactured from an electrically conductive material, and can be used as a connecting element for the surge arrester. A further connecting fitting can be provided at the opposite end of the discharge element 1 with respect to the cylinder axis 3, and, for example, is part of the bracing device.

Figure 2:
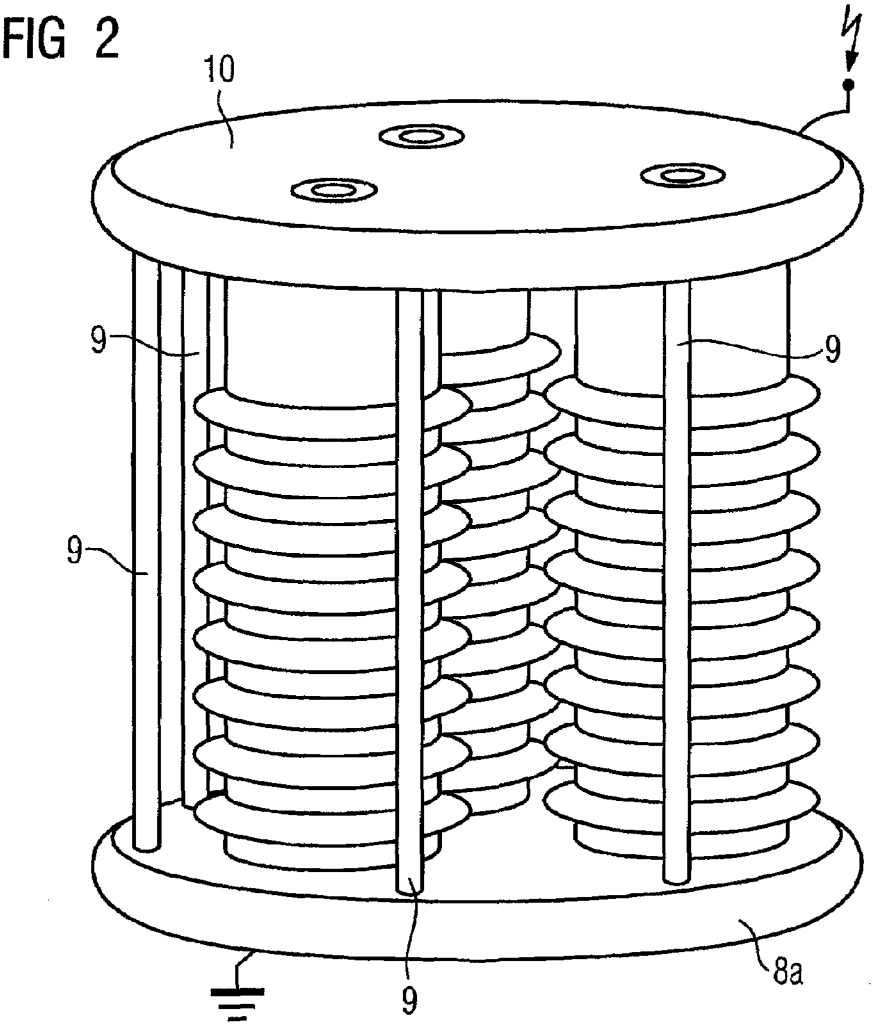
FIG. 2 shows a plurality of surge arresters, in a perspective view.

FIG. 2 shows a perspective view of three surge arresters of identical design. The three surge arresters are arranged on a common baseplate 8*a* and can be mechanically held, for example, by means of bracing elements 9. The bracing elements 9 are manufactured from insulating material, for example glass-fiber-reinforced plastic, and brace the baseplate 8*a* against a covering plate 10, with the interposition of the surge arresters. The bracing elements 9 are in the form of rods. Furthermore, it is also possible to use embodiments in the form of strips or loops. The baseplate 8*a* and the covering plate 10 are used to make electrical contact with the surge arresters. In this case, it is possible to provide for the three surge arresters to be used to carry a single discharge current, in which case the discharge current is split between the discharge elements of the three surge arresters.

Figure 3:
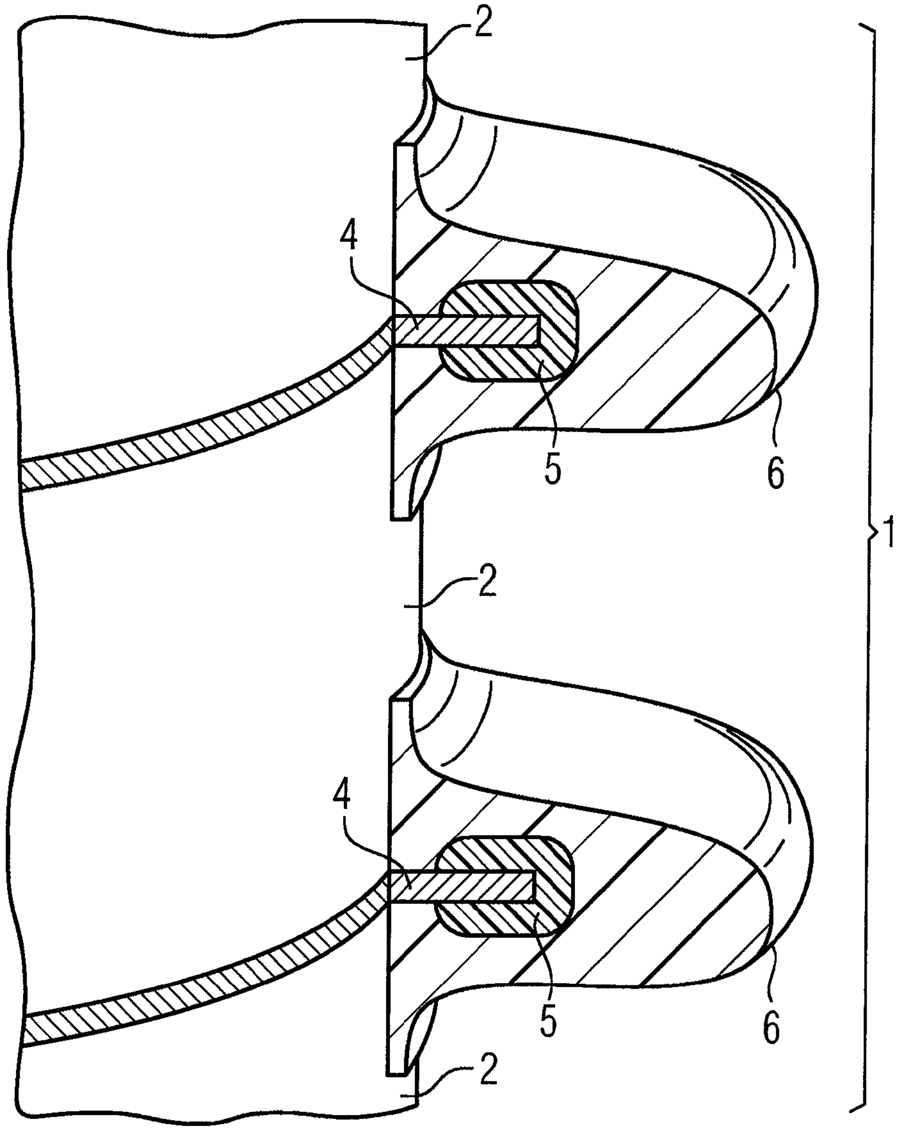
FIG. 3 shows a partial section of one embodiment of a shield.

FIG. 3 shows a partial section through a shield 6. Sections of blocks 2 can be seen, which are part of a discharge element 1. Supporting elements 4 are inserted between the abutments between the blocks 2. By way of example, the supporting elements 4 are in the form of disks, and pass through the discharge element 1 in a flat form. However, it is also possible to provide for the supporting elements, for example, to be in the form of webs, and to be arranged radially with respect to the discharge element 1. In this case, it is advantageously possible to provide for supporting elements designed in this way to also be inserted into the abutments between the blocks 2. However, it is also possible to provide for the supporting elements to be attached in some suitable form, for example by adhesive bonding, to the surface of the blocks 2.

The supporting elements 4 are each provided with a field control electrode 5. In the exemplary embodiment shown in FIG. 3, the field control electrodes 5 are manufactured from a plastic. In this case, it is advantageous to use an elastic plastic which is provided with appropriate additives in order to influence the electrical field. Annular structures which surround the discharge element 1 are advantageous. These annular structures may have circular shapes, may be oval or may have other suitable cross-sectional shapes as well. If web-like supporting elements which spread out radially are used, it is, however, also possible to provide for spherical field control electrodes to be attached to the free ends of the supporting elements.

An elastic configuration of the field control electrodes 5 has the advantage that they can be prefabricated, for example by means of an injection-molding process, and can be pushed onto the supporting elements 4, making use of their elastic deformation capability, for installation. An identical procedure can also be used for fitting the shields 6. These can likewise be prefabricated, and can be pushed onto the supporting elements 4, making use of their elastic deformation capability. However, it is also possible to provide for both the field control electrodes 5 and the shields 6 to be fitted to the discharge element 1 by means of an injection-molding or casting process.

In addition to the use of silicones to form the field control electrodes 5, it is also possible to use other plastics, provided that they are able to influence the electrical field. For this purpose, for example, it is possible to provide for the field control electrodes to have an appropriate coating on their surface, or to be subjected to a treatment, in either case resulting in adequate electrical conductivity. Alternatively, the field control electrodes 5 may, of course, also be formed from metallic materials and attached to the supporting elements.

In addition to the embodiment variants illustrated in the figures, it is also possible to provide for shielding composed of porcelain or some other insulating material to be used, which either rests on the discharge element or is kept at a distance from it by means of at least one supporting element. Appropriate recesses must then be provided in the insulating material, which do not cover the discharge element and allow good heat emission.

The invention claimed is:

1. A surge arrester, comprising:

a discharge element configured to form a discharge current path;

a shielding disposed to lengthen a creepage path, said shielding having at least two sheds composed of an electrically insulating material; and at least one section of said discharge element between said at least two sheds, said section being substantially free of said electrically insulating material.

2. The surge arrester according to claim 1, wherein said at least one section extends in an annular shape around said discharge element.

3. The surge arrester according to claim 1, which comprises a supporting element at least partially holding said sheds and being in contact with said discharge element.

4. The surge arrester according to claim 3, wherein said discharge element is formed of a plurality of mutually abutting blocks and said supporting element is a disk extending between two mutually abutting blocks.

5. The surge arrester according to claim 3, wherein said supporting element has a field control electrode for controlling an electrical field.

6. The surge arrester according to claim 1, wherein said discharge element is formed of a plurality of mutually abutting blocks, and at least one abutment between adjoining blocks is covered by a respective said shed.

7. The surge arrester according to claim 6, which comprises a supporting element inserted into said abutment and at least partially holding said shed.

8. The surge arrester according to claim 7, wherein said supporting element has a field control electrode for controlling an electrical field.

9. The surge arrester according to claim 1, wherein said electrically insulating material is silicone.

* * * * *